United States Patent [19]

Luigi

[11] Patent Number: 4,928,607
[45] Date of Patent: May 29, 1990

[54] ELECTRONICALLY CONTROLLED PNEUMATIC SEEDER

[75] Inventor: Gaspardo Luigi, Morsano Al Tagliamento, Italy

[73] Assignee: Gaspardo S.p.A., Italy

[21] Appl. No.: 320,169

[22] Filed: Mar. 7, 1989

[30] Foreign Application Priority Data

Mar. 16, 1988 [IT] Italy ................................ 19792 A/88

[51] Int. Cl.$^5$ .......................... A01C 7/04; B23Q 7/02; G07F 11/00
[52] U.S. Cl. .................................... 111/185; 111/904; 111/726; 221/13; 221/211
[58] Field of Search ............... 111/184, 185, 903, 904, 111/926, 77, 200; 340/684, 674; 221/211, 278, 2, 3, 7, 13; 56/10.2, DIG. 15; 172/4

[56] References Cited

U.S. PATENT DOCUMENTS

| 4,085,862 | 4/1978 | Steffen | 221/13 X |
| 4,122,974 | 10/1978 | Harbert et al. | 111/904 |
| 4,414,792 | 11/1983 | Bettencourt et al. | 56/10.2 |
| 4,449,642 | 5/1984 | Dooley | 221/211 |

FOREIGN PATENT DOCUMENTS

| 3440830 | 5/1986 | Fed. Rep. of Germany | 221/2 |
| 3541991 | 6/1987 | Fed. Rep. of Germany | 111/185 |

Primary Examiner—Danton D. DeMille
Attorney, Agent, or Firm—Notaro & Michalos

[57] ABSTRACT

The invention provides a pneumatic seeder wherein the various functions are controlled by electronic means. The seed distributors are operated by as many direct current motors, controlled by an electronic device as a function of the forward speed of the seeder, which speed is detected by an encoder. Electronic devices are also used for controlling both the sowing depth and the devices that adjust the seed fall.

3 Claims, 2 Drawing Sheets

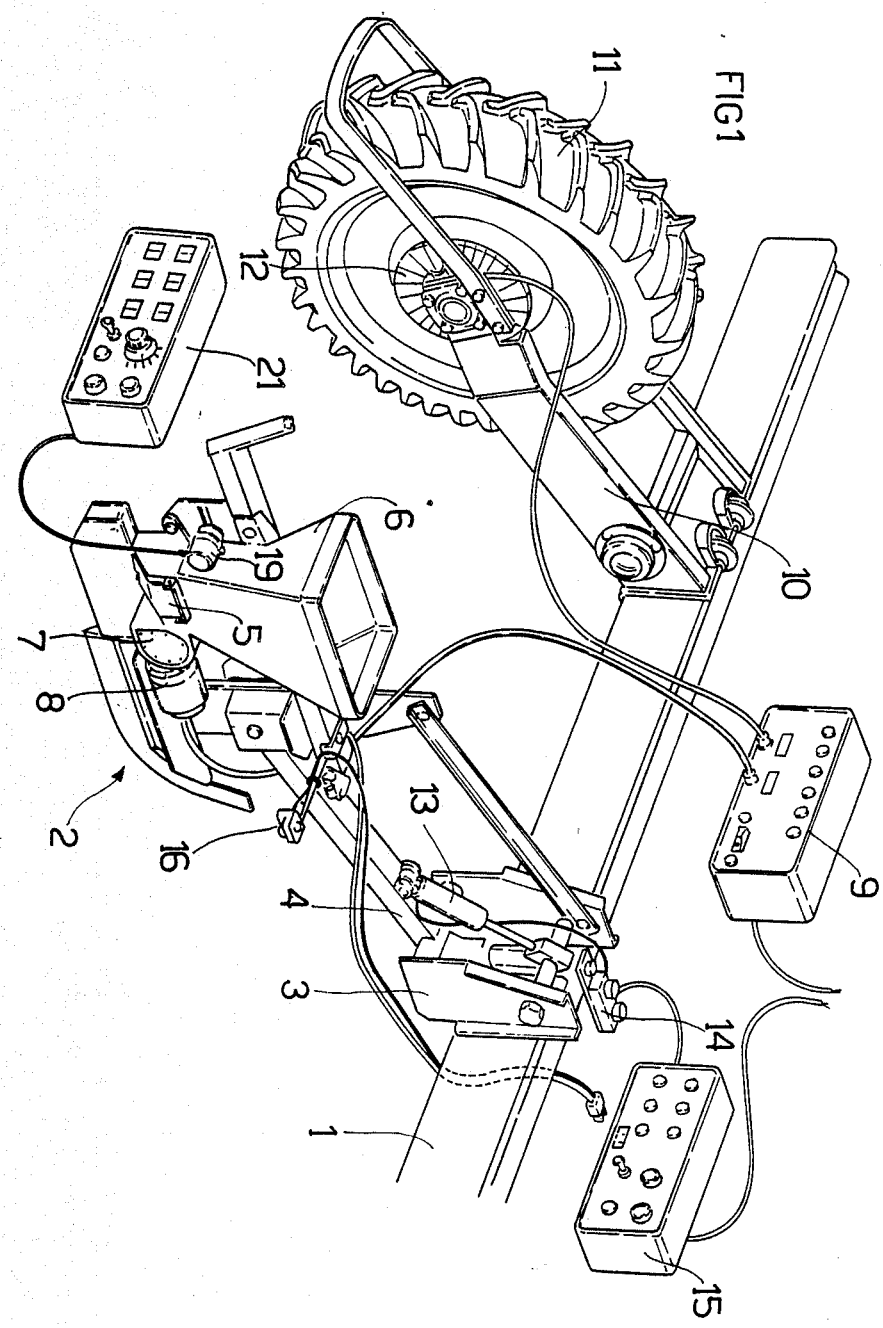

4,928,607

ELECTRONICALLY CONTROLLED PNEUMATIC SEEDER

FIELD AND BACKGROUND OF THE INVENTION

The invention relates to a seeder wherein the functions of the main components are electronically controlled.

More specifically, electronic means are employed for adjusting the speed of the distributors to the machine forward speed, and for acting upon the devices that control the seed fall, with a view to making them evenly spread over the ground, and penetrate same at a constant depth. There are known pneumatic seeders consisting substantially of a container divided in two by a revolving disk, provided with a plurality of holes all over its periphery.

One of the compartments functions as a reservoir for the seeds, while the other is a chamber kept under vacuum by suitable suction means.

By effect of vacuum the seeds adhere to the holes present on the disk, which revolves about a horizontal axis.

During such revolution, the holes pass before an area that is not subjected to vacuum, from where the seeds may fall to the ground. In the known seeders the distributor disks are rotated by the machine wheels, through mechanical transmission gears.

This system, however, is not free of some drawbacks and inconveniences: First of all, the speed of revolution of the distributor is linked to the forward speed of the machine by a limited number of fixed ratios. Secondly, this system entails as a consequence the building of very heavy costly and structurally complicated machines which, in case of wear, require considerable maintenance costs.

Italian patent applcation 20162 A/87 describes a seeder of substantially the above kind, but providing electronic devices that allow to adjust the speed of revolution of the distributors in a continuous way, so as to make it fit moment by moment to the forward speed of the machine.

SUMMARY OF THE INVENTION

An object of the present invention is the further exploitation of the opportunities offered by electronics with a view to realizing a seeder in which other main functions too, such as the adjustment of the depth of sowing and the control of the uniform distribution of seeds over the ground, are electronically performed.

This and other aims are achieved by the seeder according to the invention, as it is defined by the claims.

BRIEF DESCRIPTION OF THE DRAWINGS

The present invention will now be described in more detail, by way of example, with reference to the accompanying drawings in which:

FIG. 1 is a partial, perspective view of a seeder according to the invention;

DESCRIPTION OF THE PREFERRED EMBODIMENT

Figure 2:
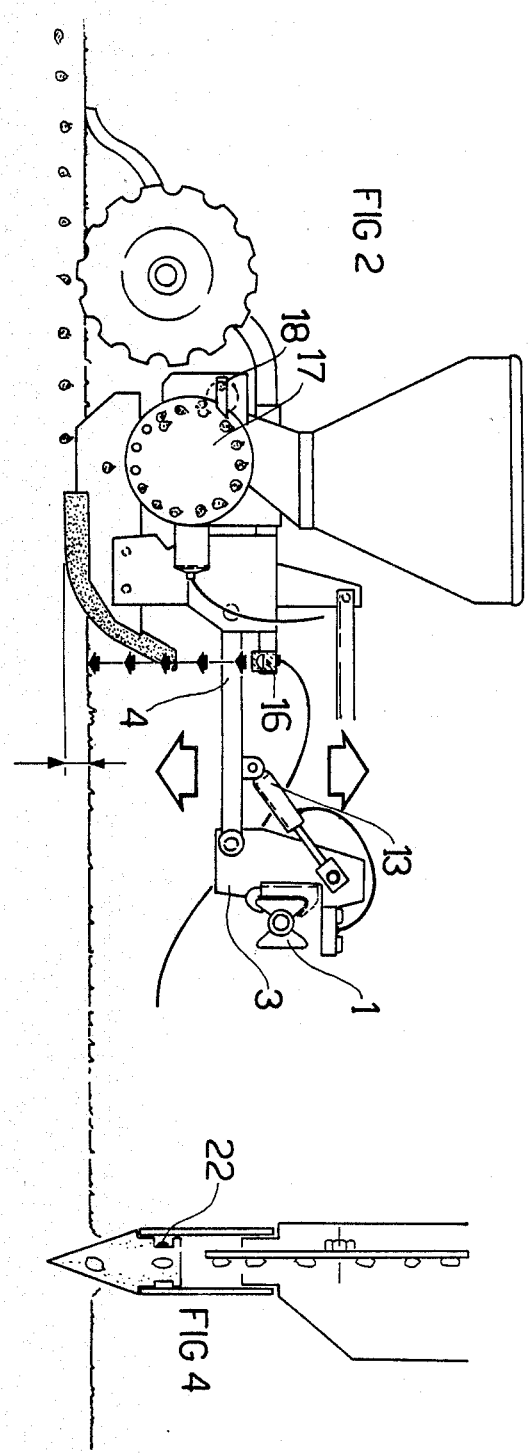
FIG. 2 is the side view of a seeder according to the invention.
Figure 3:
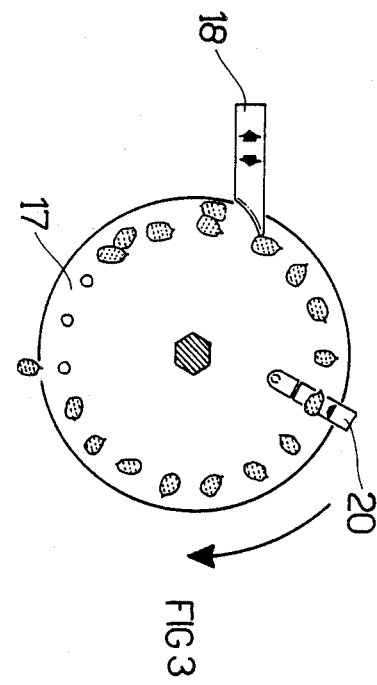
FIG. 3 is a detail of the distributor.
Figure 4:
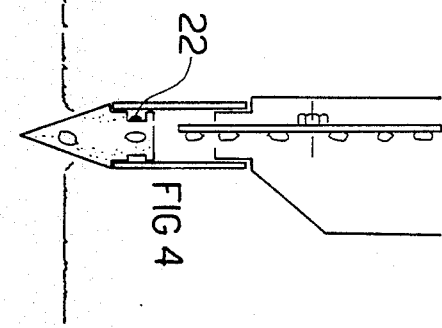
FIG. 4 is a vertical section of the distributor in a seeder according to the invention.

The seeder according to the invention consists of a frame, not shown in the Figures, comprising a crosspiece or support 1 on which are mounted, and lockable at different positions, a plurality of seeding units, one of which, being shown at 2 in FIG. 1.

Each of said seed units comprises a support 3 mounted on the crosspiece 1, a supporting arm 4 and a distributor 5.

The latter is provided, at its upper part, with a hopper 6 wherein the seeds to be scattered over the ground are introduced, and is of the revolving disk type, like those previously described.

In the specific case, however, the rotary motion of the disk is controlled by a d.c. motor 8, through a reducer 7, e.g. of the bevel gear type.

Motor 8 is controlled, in a known manner, by an electronic control device 9 set within the operator's easy reach.

A support 10 of a wheel 11 resting on the ground is fixed in the proximity to an end of crosspiece 1. On the axis of said support is mounted a transducer of known kind, e.g. an encoder 12, connected too to the control device 9.

Following the revolution of wheel 11, due to the forward motion of the seeder, the encoder 12 generates a series of impulses that are processed by the control device which, after it has been opportunely programmed, adjusts the speed of motor 8, and accordingly the speed of the distributor, to the forward speed of the tractor.

It is thus possible to simplify the transmission system of the sowing machines, to make the motion of the distributing disks perfectly conform to the tractor speed without solution of continuity and to make the rotary motion of the disks independent, if necessary, from the other parameters, by simply making transducer 12 inoperative and by directly controlling the operation of motors 8 by means of the control device. Arms 4—to the ends of which are mounted the distributors—are hinged each at their relevant support 3, and subjected to the action of a hydraulic piston 13 controlled, through an electrovalve 14, by a second electronic control device 15 housed too near the operator.

The sowing unit 2 carries a sonar 16 which emits waves that are reflected by the soil, whereby the distance of the sonar from the ground surface can be measured, as a function of the time elapsed between the emission and the reception of the wave.

In this way it is possible, by means of sonar 16, to detect the distance from the ground of the sonar itself and, consequently, of the sowing unit, so that one is informed moment by moment of the sowing depth.

Once determined, at the beginning of the operation, the desired sowing depth—to which there corresponds a given "P" value representing the distance of the sonar from the ground—the device measures the variations in such "P" value and, should these ovestep a given limit, it gives off a signal that is processed by the control device 15; the latter, through the electrovalve 14, actuates the piston 13 in order to adjust the height of unit 2, and, consequently, the sowing depth.

A slidable blade 18, actuated by a step-by-step motor 19, is placed near the disk 17 of the distributor, in the proximity to the trajectory described by the holes. In correspondence of the holes of disk 17 there is also a photocell 20 of known kind capable, when passing before each hole, of detecting the seeds—if any—.

The photocell 20 is connected to a control device 21, through which it is possible to act upon the step-by-step motor 19 to the effect of moving the blade 18 backwards or forwards, so that the same interfere to a variable extent with the trajectory of the holes over the distributor, and therfore with the seeds sticking to such holes.

In this way the disk is revolved, and the blade is moved back until photocell 20 detects the presence of a seed in correspondence of each hole.

It is thus possible to position the blade in such a way that, when more than one seed adhere to the hole, they are lightly stirred by the blade, and the excess ones fall back inside the reservoir, only one seed remaining adherent to the hole.

A different embodiment of the invention, on the contrary, provides a photocell 22 set below disk 17, in correspondence of the trajectory described by the seeds as they fall down.

This solution enables the automatic working of the apparatus: in fact, thanks to the photocell, the seeds falling from the disk can be counted, and this datum can be processed at constant intervals of time by the control device 21, in which the required data were originally introduced. If the amount of the fallen seeds is greater or lesser than the expected amount, the control device will automatically operate in a known manner the step-by-step motor 19, that will bring in turn the blade 18 to a closer or looser engagement with the hole trajectory.

An expert in the art can provide for several amendments and variations, which should fall, however, within the scope of the present invention.

I claim:

1. A pneumatic seeder, comprising:
    a support;
    a seeding unit connected to said support;
    a revolving disc distributor mounted for rotation to said seeding unit and having a plurality of holes for engaging a plurality of seeds, the holes being movable in a trajectory with rotation of said distributor;
    a distributor motor connected to said distributor for rotating said distributor;
    a wheel rotatably mounted about an axis to said support, said wheel being adapted for contacting the ground for rotation of said wheel with movement of the support over the ground;
    a speed transducer operatively connected to said wheel for transmitting a series of impulses which are indicative of speed of the support over the ground;
    a blade connected to said seeding unit and movable toward and away from the trajectory of the holes of the distributor, for contacting seeds engaged with the holes of the distributor;
    a blade motor connected to said blade for moving said blade;
    a photocell located in the proximity of the trajectory of the holes for sensing the presence of seeds engaged with the holes;
    first electronic control means connected between said speed transducer and said distributor motor for receiving the series of impulses and for controlling the speed of the distributor motor as a function of the speed of the support over the ground; and
    second electronic control means connected between said photocell and said blade motor for controlling the movement of said blade as a function of signals from said photocell, to move said blade motor to a greater or lesser extent into engagement with the trajectory of the holes of said distributor.

2. A pneumatic seeder according to claim 1 including hydraulic piston means connected between said seeding unit and said support for changing the elevation of said seeding unit with respect to the ground, ground sensing means connected to said seeding unit for generating signals indicative of the distance of said seeding unit above the ground, and third electronic control means operatively connected between said ground sensing means and said hydraulic piston means for controlling said hydraulic piston means to move said seeding unit to a selected distance above the ground, as function of signals received from said ground sensing means.

3. A pneumatic seeder according to claim 2 wherein said ground sensing means comprises sonar connected to said seeding unit.

* * * * *